May 19, 1925.
H. H. D. KLINKER
WINDOW GLASS ATTACHMENT
Filed Aug. 15, 1923
1,538,560
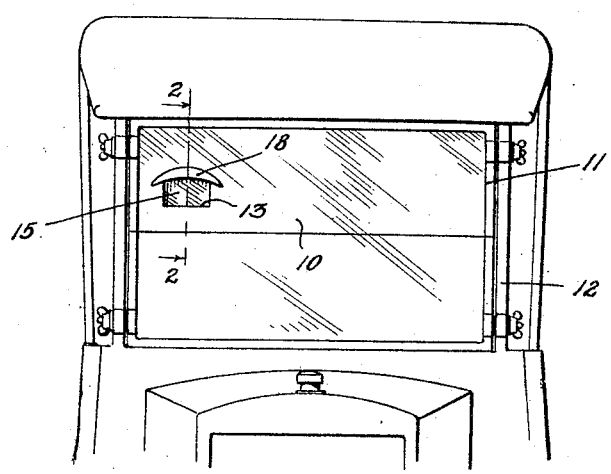
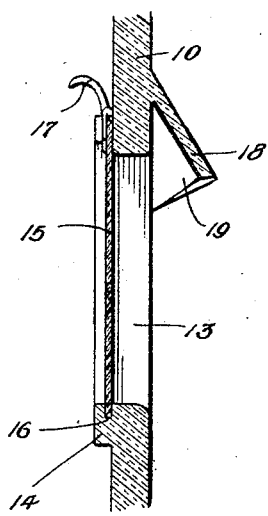
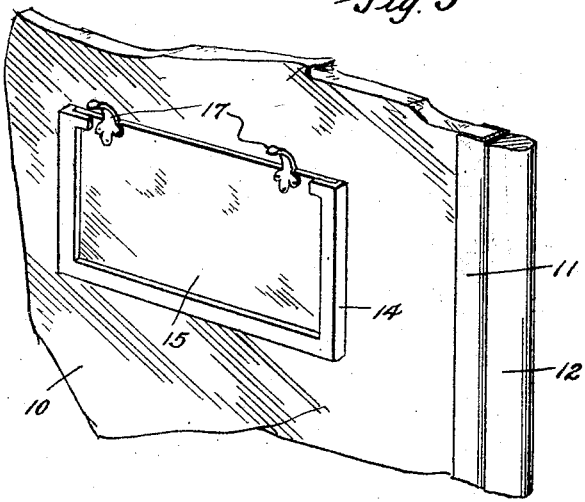
H. Henry D. Klinker,
INVENTOR,
BY Geo. W. Beeler
ATTORNEY
WITNESS Chris Feimle Jr.

Patented May 19, 1925.

1,538,560

UNITED STATES PATENT OFFICE.

HERMAN H. D. KLINKER, OF NEW YORK, N. Y.

WINDOW-GLASS ATTACHMENT.

Application filed August 15, 1923. Serial No. 657,498.

*To all whom it may concern:*

Be it known that I, HERMAN H. D. KLINKER, a citizen of the United States, residing at New York city, borough of Manhattan, in the county of New York and State of New York, have invented certain new and useful Improvements in Window-Glass Attachments, of which the following is a specification.

This invention relates to window pane or window glass constructions, and has particular reference to outlooks such as windshields for automobiles, windows for trolley car vestibules or locomotives, or any other kind or type of window through which observation must be made more or less constantly and with maximum facility and reliability.

Among the many and various objects of the invention is to provide a window with an attachment so designed and constructed as to prevent obstruction to the vision as a result of accumulations of snow, frost, ice, or rain.

Another object is to provide a window construction with a separable section or attachment, the attachment being made of any suitable material and especially one having a color or tint calculated to prevent the passage therethrough of a kind or strength of light which otherwise would tend to produce so much glare as to render the control of the machine difficult.

A still further object of the invention is to provide for a window a detachable section or portion, the detachment of the section being calculated not only for ready interchange of the section with a different section, but also to enable the operator to keep the view through the window perfectly unobstructed or in accordance with the nature of the light being encountered.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1 is a front elevation of a portion of an automobile showing my improvement applied.

Fig. 2 is an enlarged vertical section on the line 2—2 of Fig. 1.

Fig. 3 is an inside perspective showing more particularly the manner of securing the detachable section of the window in place.

Referring now more specifically to the drawings, but with the distinct understanding that the scope of the invention is not to be limited unnecessarily in any manner to the mechanism illustrated, except as may be required by the state of the art, 10 indicates a plate of glass or the like constituting a window and shown as supported in a rim 11 connected adjustably in a support or frame 12 as is well understood.

Many devices have been proposed for keeping the window pane plate such as 10 clear or free from accumulations of extraneous matter which tend to obstruct vision from within the machine and also to provide means to modify the light as to quality or quantity coming rearward through the window and tending to blind or confuse the operator of the machine.

As indicated, the plate 10 is provided with an opening 13 at either side and at an elevation approximating the normal horizontal line of vision of the operator. Surrounding or adjacent to the boundary of the opening 13, and preferably on the rear wall of the plate 10 is formed a seat 14 for a separable section 15 of the window. Said seat is shown as being an integral extension along the vertical sides and across the bottom of the opening and provided with a groove 16 into which the side and bottom edges of the section 15 are fitted slidably.

The section 15 may be of any suitable material according to the purpose to which it is to be put, such as glass either transparent or translucent, or it may be made of a more pliable or flexible material such as celluloid or its equivalent and of any suitable shape or color. The section 15 is shown provided with finger pieces 17 formed on or attached to its upper edge and through the grasping of which the section 15 may be manipulated. It is obvious that for ordinary driving purposes the plate 10 may be employed as usual without reference to the section 15 and in case of the appearance of a glaring light in front the operator may resort to looking through the section 15, such section at such time being of a suitable tinted body sufficient to reduce or kill the objectionable glare. Or the character of the section 15 may be such as to adapt it for normal vision therethrough.

Extending over the outside of the opening 13 is a shield 18. This shield is indicated as an integral extension forward and downward from that portion of the plate 10 above the opening. It might be otherwise constructed, however, and while I have indicated it as mainly of glass it may be faced inside with some opaque or translucent material such as paint or sheet material indicated at 19, for the purpose of shading the sight section 15 from the sunlight or glare from other lights that might tend to interfere with proper vision through the sight. Preferably the lower edge of the shield extends downward somewhat below the top of the opening 13. This serves also to prevent to a large extent the accumulation of rain or snow upon the sight section of the window. Should, however, snow or the like drift back against the section 15 the same may be removed easily by simply lifting the section 15 out of its seat and replacing it. It is obvious also that the section 15 may be made of different degrees of density according to day or night service or the personality of the various drivers who may be seated back of it or other conditions, and the detachability renders the use of various sections an easy expedient. Also, in connection with closed cars, now commonly used, it is in some cases desirable to remove the section 15 for the purpose of ventilation or draft without necessitating the adjustment of the windshield as a whole.

I claim:

1. In a device as set forth, the combination with a window plate having an opening therethrough, of a seat formation adjacent to the opening, and a section fitted in said seat and across said opening, said seat being composed of an integral extension of the plate along certain edges of the opening.

2. In a device as set forth, the combination with a window plate having an opening therethrough, of a seat formation adjacent to the opening, and a plate section fitted in said seat and adapted to slide across said opening and in contact with said plate whereby an edge portion of said opening will serve to clean the section when the same is drawn across the opening.

In testimony whereof I affix my signature.

HERMAN H. D. KLINKER.